US012531198B2

(12) United States Patent
Sim

(10) Patent No.: US 12,531,198 B2
(45) Date of Patent: Jan. 20, 2026

(54) LATCH ASSEMBLY AND MAGNETIC CONTACTOR INCLUDING SAME

(71) Applicant: LS ELECTRIC CO., LTD., Anyang-si (KR)

(72) Inventor: Byeongsun Sim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 167 days.

(21) Appl. No.: 18/035,698

(22) PCT Filed: Nov. 1, 2021

(86) PCT No.: PCT/KR2021/015586
§ 371 (c)(1),
(2) Date: May 5, 2023

(87) PCT Pub. No.: WO2022/098021
PCT Pub. Date: May 12, 2022

(65) Prior Publication Data
US 2024/0013995 A1 Jan. 11, 2024

(30) Foreign Application Priority Data
Nov. 6, 2020 (KR) ........................ 10-2020-0147981

(51) Int. Cl.
*H01H 50/32* (2006.01)
*H01H 50/04* (2006.01)
*H01H 50/24* (2006.01)
*H01H 50/44* (2006.01)

(52) U.S. Cl.
CPC ............ *H01H 50/32* (2013.01); *H01H 50/04* (2013.01); *H01H 50/24* (2013.01); *H01H 50/44* (2013.01)

(58) Field of Classification Search
None
See application file for complete search history.

(56) References Cited

U.S. PATENT DOCUMENTS

| | | | | |
|---|---|---|---|---|
| 11,749,480 | B1 * | 9/2023 | Gottschalk | H01H 50/32 335/167 |
| 2002/0158732 | A1 * | 10/2002 | Castonguay | H01H 71/126 335/172 |
| 2017/0018385 | A1 * | 1/2017 | Choi | H01H 50/36 |

FOREIGN PATENT DOCUMENTS

| | | | |
|---|---|---|---|
| JP | S5480537 | A | 6/1979 |
| JP | 08031290 | A | 2/1996 |
| JP | 2000251601 | A | 9/2000 |
| KR | 20020008714 | A | 1/2002 |
| KR | 100563343 | B1 | 3/2006 |
| KR | 100722256 | B1 | 5/2007 |
| KR | 20130029584 | A | 3/2013 |

(Continued)

*Primary Examiner* — Bernard Rojas
(74) *Attorney, Agent, or Firm* — K&L Gates LLP

(57) ABSTRACT

A latch assembly and a magnetic contactor including same are disclosed. A latch assembly according to one embodiment of the present disclosure comprises: a frame; a movable core and a latch unit, which are rotatably coupled to the frame. The movable core is rotatably coupled to a trip coil unit by means of a coupling member. An insertion hole for rotatably supporting the latch unit is formed on the frame. The movable core rotates along the coupling member. In addition, the latch unit is guided and rotated along the insertion hole. Therefore, the operational reliability and endurance limit of the latch assembly can be enhanced.

13 Claims, 10 Drawing Sheets

(56) References Cited

FOREIGN PATENT DOCUMENTS

| | | | |
|---|---|---|---|
| KR | 20150097289 | A | 8/2015 |
| KR | 101951428 | B1 | 2/2019 |

* cited by examiner

LATCH ASSEMBLY AND MAGNETIC CONTACTOR INCLUDING SAME

CROSS-REFERENCE TO RELATED APPLICATIONS

This application is the National Stage filing under 35 U.S.C. 371 of International Application No. PCT/KR2021/015586, filed on Nov. 1, 2021, which claims the benefit of earlier filing date of and right of priority to Korean Application No. 10-2020-0147981 filed on Nov. 6, 2020, the contents of which are incorporated by reference herein in their entirety.

FIELD

The present disclosure relates to a latch assembly and a magnetic contactor including the same, and more particularly, to a latch assembly having a structure capable of enhancing operational reliability and contact reliability, and a magnetic contactor including the same.

BACKGROUND

A magnetic contactor (contact switch) is a device that opens and closes an electric circuit using an electromagnet. A magnetic contactor includes a plurality of coils. An external power source applies current to one or more of the plurality of coils.

The magnetic contactor is electrically connected to an external power source and a load. At this time, one of the plurality of coils forms a magnetic field for a closing operation, that is, for achieving an electric connection between the magnetic contactor and the external power source and the load. In addition, another one of the plurality of coils forms a magnetic field for a trip operation, that is, for releasing the electric connection between the magnetic contactor and the external power source and the load.

At this time, a closed state and a trip state are achieved by a latch assembly that is provided in the magnetic contactor.

Referring to FIGS. 1 to 4, a latch assembly 1500 according to the related art and a magnetic contactor 1000 including the same are illustrated.

Referring to FIGS. 1 and 3, the magnetic contactor 1000 according to the related art in a trip state is illustrated. That is, the illustrated state is before the magnetic contactor 1000 is closed by the external power source.

When external power is applied to a coil 1300, a movable plate 1400 is rotated toward the coil 1300 by a magnetic field formed by the coil 1300.

Accordingly, the movable plate 1400 presses a trip lever 1550 of the latch assembly 1500. The pressed trip lever 1550 is rotated centering on a trip pin 1551. At this time, the rotated state of the movable plate 1400 is maintained by a bearing that is rotatably coupled to the trip pin 1551.

Through the above process, the magnetic contactor 1000 according to the related art can be electrically connected to each of an external power source and a load.

Referring to FIGS. 2 and 4, the magnetic contactor 1000 according to the related art in a closed state is illustrated. That is, in the state, the magnetic contactor 1000 is electrically connected to the external power source and the load by external power.

In this state, when power is applied to a trip coil 1540, a movable core 1530 is attracted toward the trip coil 1540 by a magnetic field formed by the trip coil 1540. Accordingly, the trip lever 1550 is rotated in an opposite direction to a direction upon the closing operation.

At this time, the trip lever 1550 may be rotated until the trip pin 1551 is brought into contact with a support pin 1521.

As the trip lever 1550 is rotated, the movable plate 1400 is rotated away from the latch assembly 1500.

Meanwhile, the trip lever 1550 is rotated while pressing a torsion spring 1552 during the trip operation. Accordingly, when the trip operation is completed and the current applied to the trip coil 1540 is cut off, the trip lever 1550 is returned to its original position by a restoring force of the torsion spring 1552.

However, the magnetic contactor 1000 according to the related art as described above has the following problems.

First, a moving distance of the movable core 1530 is limited by a first frame 1510. That is, the movable core 1530 is coupled through a hole that is formed in the first frame 1510. At this time, the movable core 1530 inevitably collides with the first frame 1510.

Therefore, the movable core 1530 or the first frame 1510 may be physically damaged due to collision and friction.

In addition, when the movable core 1530 is attracted to the trip coil 1540, a moving distance of the movable core 1530 is also limited by the first frame 1510. Accordingly, there is a possibility that the movable core 1530 may not be moved by a sufficient distance when the latch assembly 1500 operates.

As a result, operational reliability of the magnetic contactor 1000 according to the related art may be difficult to be guaranteed, and its durability (endurance limit) may also be reduced.

Korean Patent Publication No. 10-2013-0029584 discloses a magnetic contactor for switching a polarity of electromagnetic force of a movable core. Specifically, a magnetic contactor having a structure in which a power supply circuit supplying current to a coil selectively supplies bidirectional current to switch a polarity of electromagnetic force formed by a movable core is disclosed.

However, the magnetic contactor of this structure has a limitation in that it only presents a method for moving a movable core using a single coil. That is, the related art fails to suggest a method for preventing damage to other components caused by a movement of the movable core.

Korean Patent Document No. 10-0563343 discloses a holding mechanism and an automatic change mechanism of a contactor. Specifically, a holding mechanism and an automatic switching mechanism of a contactor including an adsorption holding mechanism for fixing a contactor held by a latch mechanism in a frame body by vacuum adsorption force are disclosed.

However, the holding mechanism and automatic switching mechanism of the contactor have a limitation in that only a method for maintaining the position of the contactor is suggested. That is, the prior art documents do not suggest a method for preventing damage to other components due to the movement of the contactor.

Furthermore, the prior art documents also do not suggest a method for improving operational reliability and durability of the magnetic contactor.

PRIOR ART DOCUMENT

Patent Document

[Patent Document 1) Korean Patent Publication No. 10-2013-0029584 (Mar. 25, 2013)

[Patent Document 2) Korean Patent Registration No. 10-0563343 (Mar. 22, 2006)

SUMMARY

The present disclosure describes a latch assembly of a structure that is capable of solving those problems, and a magnetic contactor including the same.

One aspect of the present disclosure is to provide a latch assembly having a structure capable of improving operational reliability, and a magnetic contactor including the same.

Another aspect of the present disclosure is to provide a latch assembly having a structure capable of improving durability (endurance limit), and a magnetic contactor including the same.

Still another aspect of the present disclosure is to provide a magnetic contactor having a structure in which a movement of a member operated upon switching to a trip state or a closed state is not restricted.

Still another aspect of the present disclosure is to provide a latch to assembly having a structure capable of quickly performing switching to a trip state or a closed state, and a magnetic contactor including the same.

Still another aspect of the present disclosure is to provide a latch assembly having a structure capable of miniaturizing a product and a magnetic contactor including the same.

In order to achieve those aspects and other advantages according to the present disclosure, there is provided a latch assembly that may include a frame, a movable core rotatably coupled to the frame, a trip coil unit electrically connected to an external trip power source, coupled to the frame, and applying attractive force to the movable core, and a latch unit located adjacent to the movable core and the trip coil unit, rotatably coupled to the frame, and brought into contact with and spaced apart from the movable core. An insertion hole may be formed through the frame to have a cross-section in an arcuate shape, so that the latch unit is slidably coupled through the insertion hole.

The frame of the latch assembly may include a first frame to which the movable core is rotatably coupled, a second frame continuous with the first frame at a predetermined angle and supporting the trip coil unit from a lower side, a third frame continuous with the second frame and extending in a direction opposite to the first frame, and a fourth frame continuous with the third frame at a predetermined angle and rotatably coupled to the latch unit. The fourth frame may be provided in plurality, and the plurality of fourth frames may be disposed to face each other. The insertion hole may be formed in any one of the plurality of fourth frames.

The frame may include a first space portion that is a space partially surrounded by the first frame and the second frame, and the trip coil unit may be accommodated in the first space portion.

The movable core of the latch assembly may be located to face the second frame with the trip coil unit interposed therebetween, and may be rotatably coupled to the first frame in any one direction of a direction toward the is trip coil unit and a direction away from the trip coil unit.

In addition, the movable core of the latch assembly may include a first plate located adjacent to the trip coil unit, a second plate continuous with the first plate, extending toward the latch unit, and brought into contact with or spaced apart from the latch unit in response to the rotation of the movable core, and a third plate continuous with the first plate, extending toward the first frame, and rotatably coupled to the first frame. The first frame may include an insertion groove formed therethrough such that the third plate is inserted.

The movable core of the latch assembly may include a first plate located adjacent to the trip coil unit and rotated in a direction toward the trip coil unit and in a direction away from the trip coil unit. A hollow portion may be formed through the trip coil unit and extend in a direction toward the first plate and a direction away from the first plate. A return member may be located in the hollow portion, and deformed by being pressed by the movable core so as to store restoring force.

The return member of the latch assembly may extend in a direction in which the hollow portion extends, and an end portion of the return member that faces the first plate, of end portions of the return member in the extension direction, may be exposed to outside of the hollow portion, so as to be located between the first plate and the trip coil unit.

A through hole may be formed through an inside of the first plate of the latch assembly, and the trip coil unit may include a coupling member coupled through the through hole and the hollow portion.

The coupling member of the latch assembly may extend in the direction in which the hollow portion extends, and an end portion of the coupling member facing the first plate, of end portions of the coupling member in the extension direction, may be exposed to the outside of the first plate.

A distance between the end portion of the coupling member and the first plate may be longer than or equal to a length of a path along which the latch unit is rotated.

The latch unit of the latch assembly may include a latch pin coupled through the insertion hole, extending in one direction, and brought into contact with and spaced apart from the movable core, a shaft member connected to the latch pin and rotatably coupled to the plurality of fourth frames, and an elastic member coupled through the shaft member and storing a restoring force by being deformed due to rotation of the latch unit.

The elastic member of the latch assembly may be a coil spring.

According to the present disclosure, the following effects can be achieved.

First, a through hole is formed through a first plate of a movable core. A hollow portion is formed through an inside of a trip coil unit located below the movable core and extends in a height direction. A coupling member is coupled through the through hole and the hollow portion. At this time, the coupling member is coupled to the movable core and the trip coil unit so that a distance between an end thereof and the first plate is longer than or equal to a distance by which the movable core is rotated.

Therefore, when the movable core is moved toward and away from the trip coil unit, the movable core is guided by the coupling member. That is, the movable core is moved along a preset path, and an occurrence of unnecessary shaking of the movable core is prevented. Accordingly, operational reliability of a is latch assembly and a magnetic contactor including the latch assembly can be improved.

In addition, a latch unit is rotatably coupled to a frame. An insertion hole is formed inside a fourth frame to which the latch unit is coupled among a plurality of components constituting the frame. The insertion hole is formed in an arcuate shape extending by a predetermined length along a path along which the latch unit is rotated.

Therefore, the rotation of the latch unit can be limited by each end of the insertion hole in a direction in which the insertion hole extends. At this time, since the insertion hole is formed inside the fourth frame formed in a plate shape, it has higher rigidity than a member in a shape of a beam. Accordingly, damage to the frame can be prevented even when the latch unit is repeatedly rotated and collided, thereby improving durability.

In addition, with the configuration, a rotational movement distance of the latch unit, in other words, a rotational angle of the latch unit is limited only by the shape of the insertion hole. That is, the latch assembly is not provided with other components that limit the rotational angle of the latch unit.

Therefore, the rotation of the latch unit for switching to a trip state or a closed state is not restricted.

In addition, a return member is provided in the trip coil unit. The return member is pressed by the movable core in the trip state and is deformed to store restoring force. In addition, an elastic member is provided in the latch unit. In the trip state, the elastic member is pressed by rotation of other components of the latch unit and is deformed to store restoring force.

When the trip state is released and switched to the closed state, the return is member and the elastic member are restored to their original shapes so as to apply the stored restoring forces to the movable core and the latch unit, respectively.

Therefore, since the movable core and the latch unit can be respectively returned by the separate members, switching to the trip state or the closed state can be performed quickly and accurately.

Also, components constituting the latch assembly are coupled to the frame. The frame is configured as a single member, including first to fourth frames that are continuous with one another.

Therefore, a size of the frame accommodating the components of the latch assembly can be minimized. This can also minimize a size of the magnetic contactor including the latch assembly.

DETAILED DESCRIPTION

Figure 1:
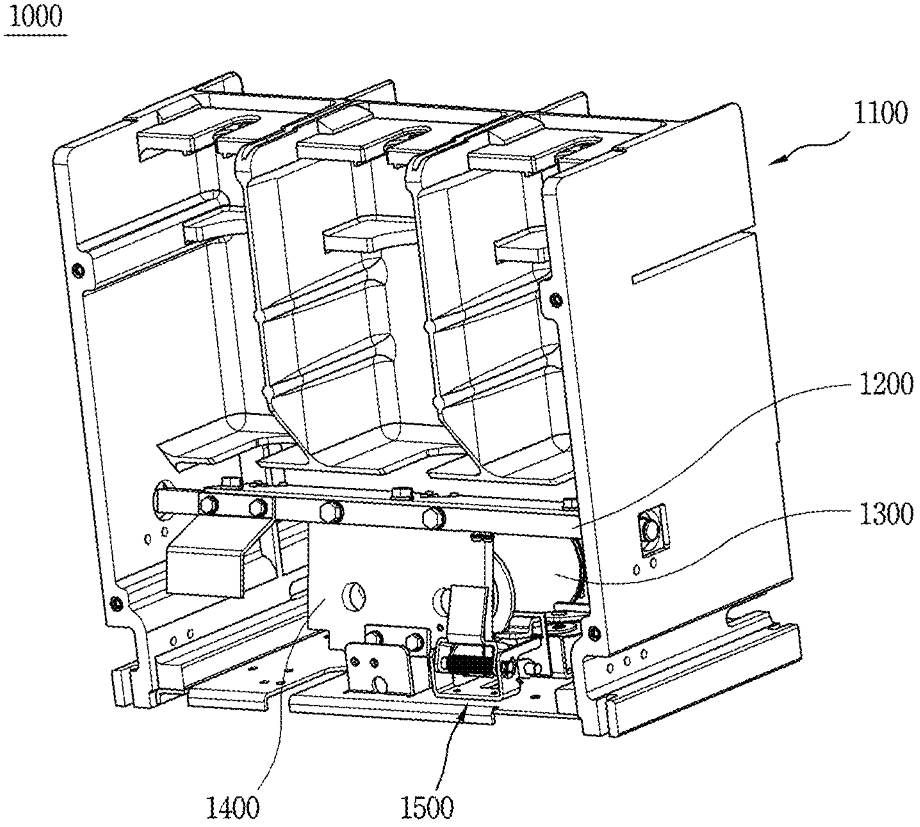
Fig. 1 (Prior Art)
FIG. 1 is a perspective view illustrating a magnetic contactor according to the related art.
Figure 2:
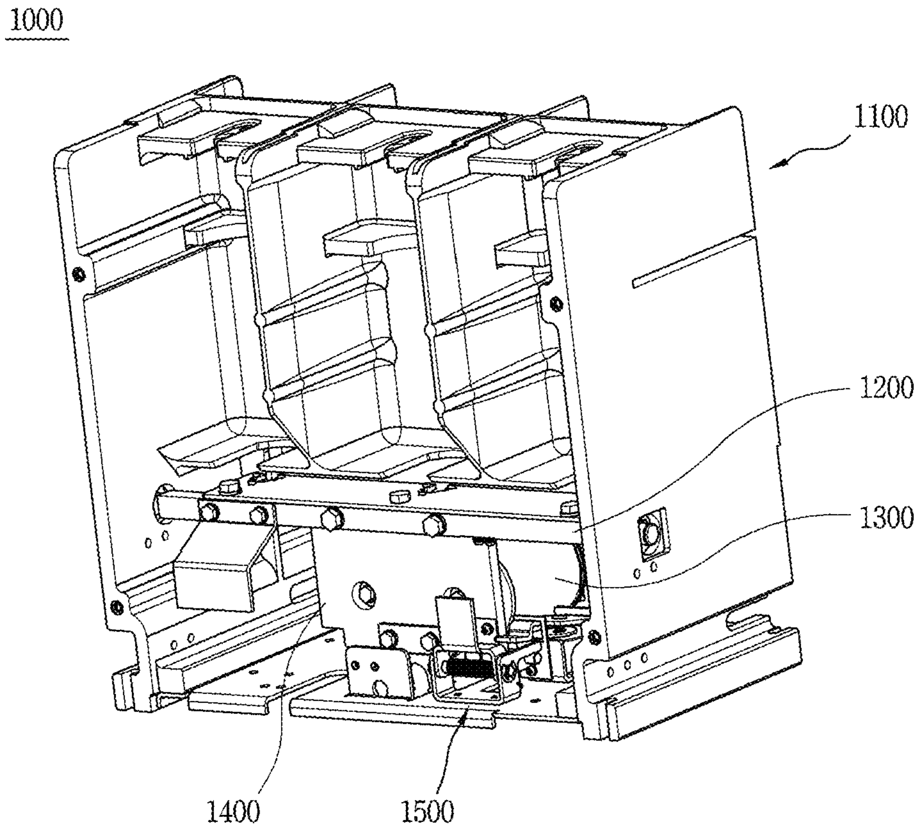
Fig. 2 (Prior Art)
FIG. 2 is a perspective view illustrating a closed state of the magnetic contactor according to the related art.
Figure 3:
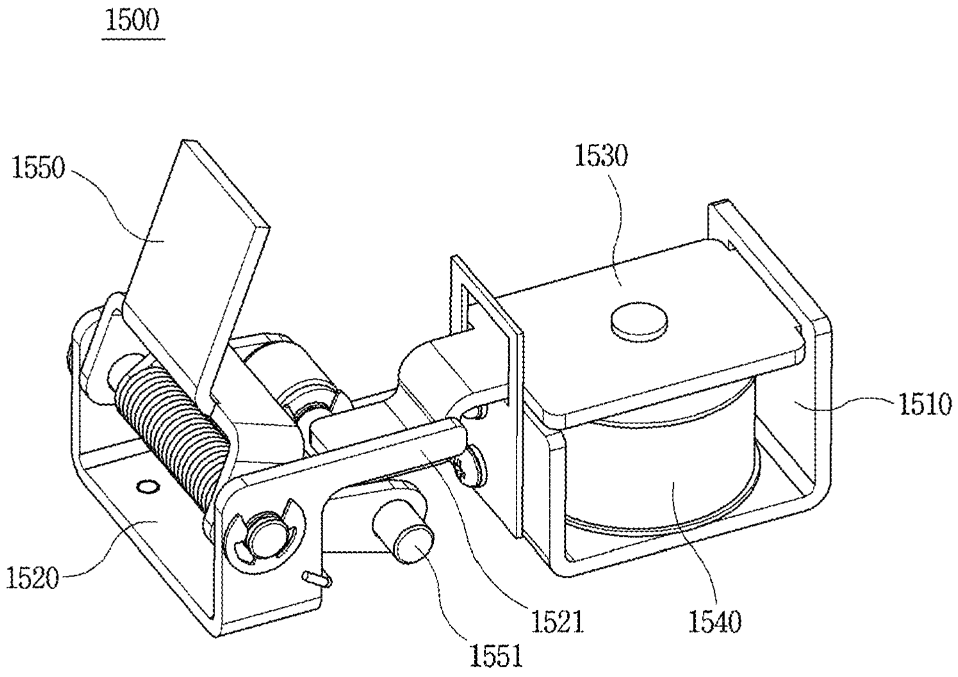
Fig. 3 (Prior Art)
FIG. 3 is a perspective view illustrating a latch assembly provided in the magnetic contactor according to the related art.
Figure 4:
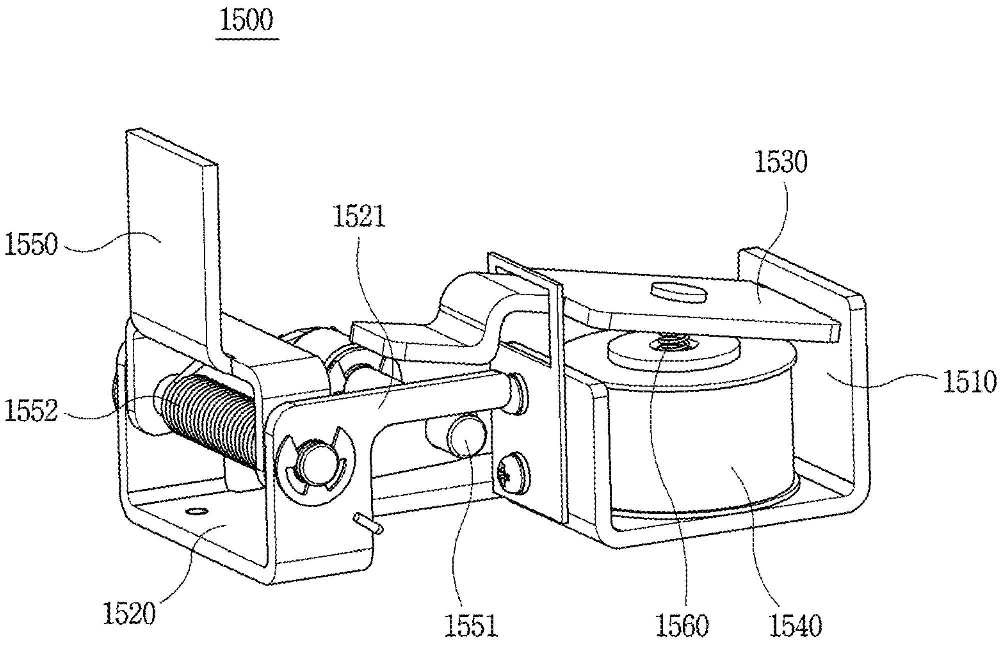
Fig. 4 (Prior Art)
FIG. 4 is a perspective view illustrating a closed state of the latch to assembly provided in the magnetic contactor according to the related art.
Figure 5:
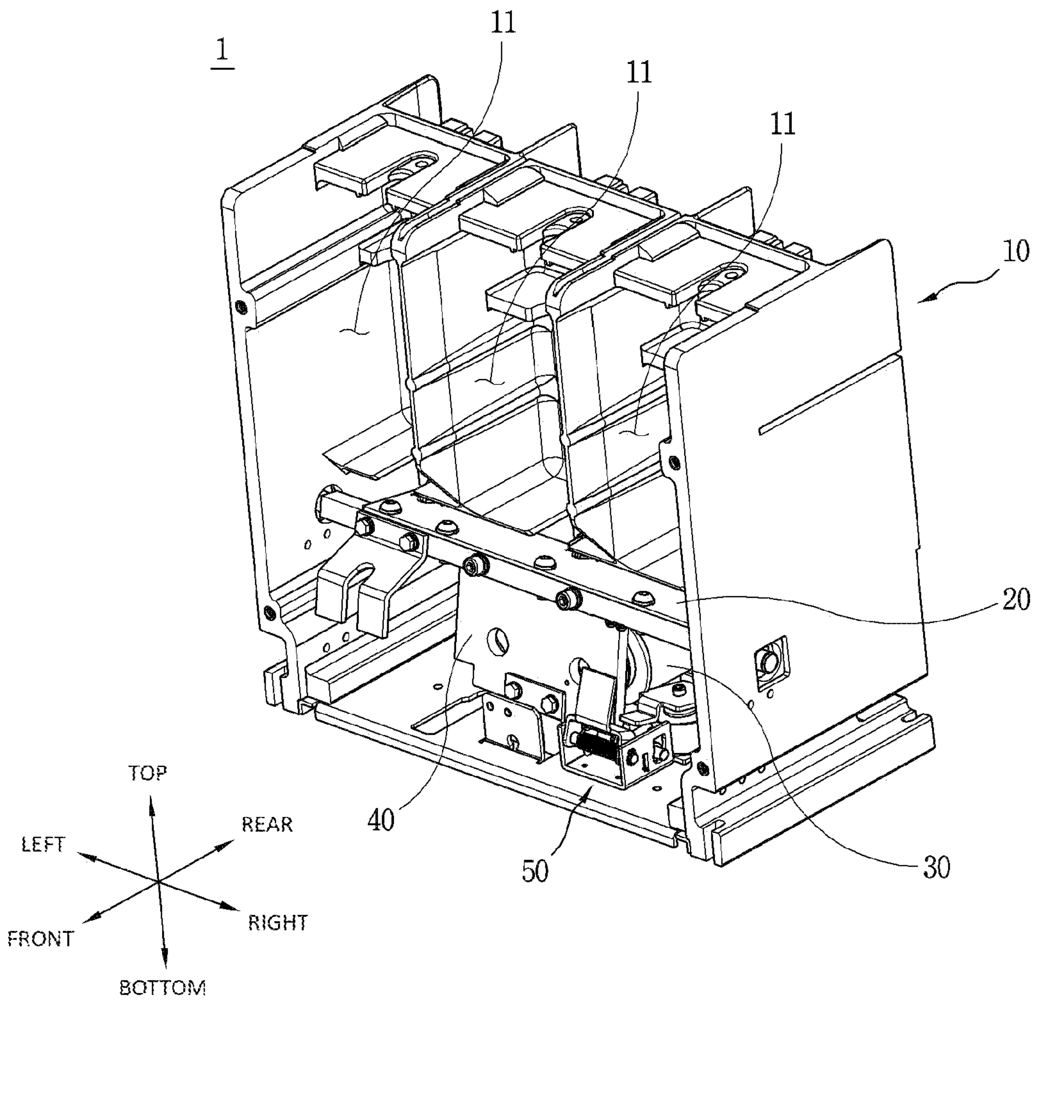
FIG. 5 is a perspective view illustrating a magnetic contactor that is in a trip state and includes a latch assembly in accordance with an embodiment of the present disclosure.
Figure 6:
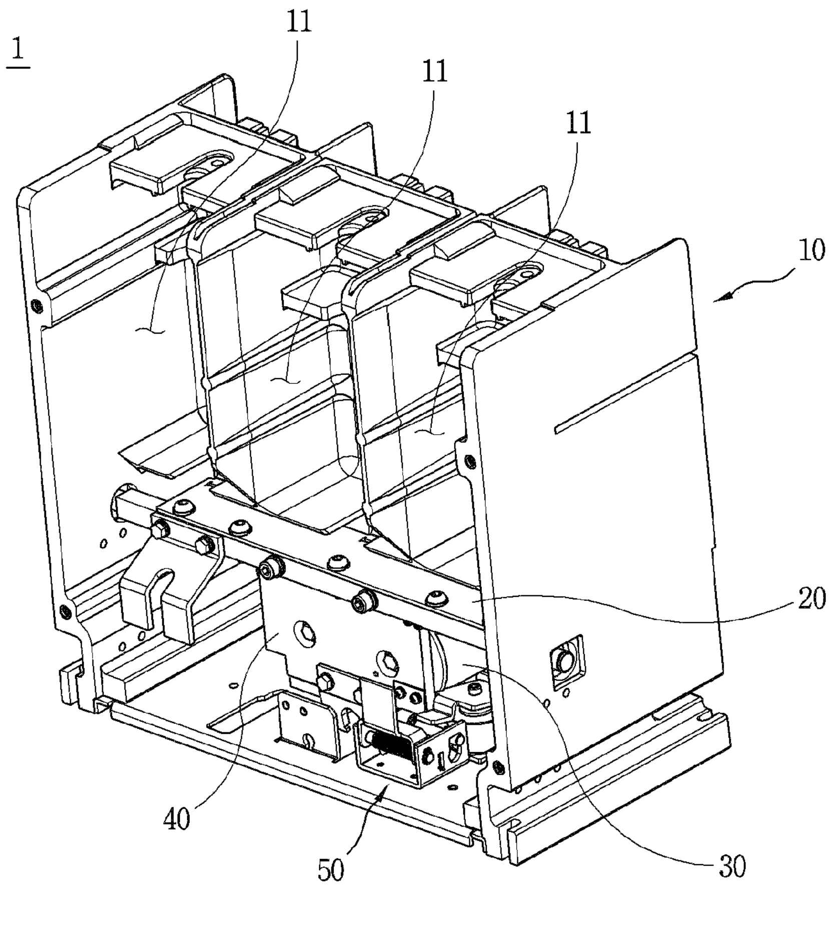
FIG. 6 is a perspective view illustrating a closed state of the magnetic is contactor of FIG. 5.

Hereinafter, a latch assembly 50 and a magnetic contactor 1 including the same according to an embodiment of the present disclosure will be described in detail with reference to the accompanying drawings.

In the following description, descriptions of some components will be omitted to help understanding of the present disclosure.

1. Definition of Terms

The term "electrical connection" used in the following description means a state in which an electrical signal such as current is transmitted between at least two members. In one embodiment, the electrical connection may be made by a contact between the at least two members or by a separate wire member.

The term "closed state" used in the following description means a state in which the magnetic contactor 1 is electrically connected to an external power to source or load.

The term "trip state" used in the following description means a state in which the magnetic contactor 1 is electrically disconnected from an external power source or load.

The term "closing power source" used in the following description means is a power source for applying current to a coil 30 to be described later. That is, the closing power source is a power source that applies power to switch the magnetic contactor 1 into a closed state. The closing power source may be electrically connected to the coil 30 by an arbitrary member such as a wire.

The term "trip power source" used in the following description means a power source that applies current to a trip coil unit 300 to be described later. That is, the trip power source is a power source that applies power to switch the magnetic contactor 1 into a trip state. The trip power source may be electrically connected to the trip coil unit 300 by an arbitrary member such as a wire.

The term "rotation" used in the following description means a state of moving while drawing an arc around a predetermined shaft. In one embodiment, the rotation may include orbiting (turning).

The terms "front", "rear", "left", "right", "top", and "bottom" used in the following description will be understood based on a coordinate system illustrated in FIG. 7.

2. Description of Configuration of Magnetic Contactor 1 According to Embodiment Referring to FIGS. 5 to 8, a magnetic contactor 1 according to an embodiment includes a housing 10, a support plate 20, a coil 30, a movable plate and a latch assembly 50.

The magnetic contactor 1 according to the embodiment of the present disclosure is electrically connected to an external power source or load. In addition, the magnetic contactor 1 is also electrically connected to an external closing power source (not illustrated) and a trip power source (not illustrated).

As the closing power source (not illustrated) and the trip power source is (not illustrated) are selectively connected, the magnetic contactor 1 may be electrically connected to or disconnected from the external power source or load.

Hereinafter, each component of the magnetic contactor 1 according to the embodiment will be described with reference to the accompanying drawings, and the latch assembly 50 will be described as a separate clause.

The housing 10 defines appearance of the magnetic contactor 1. A space is defined inside the housing 10, and various components for performing functions of the magnetic contactor 1 can be mounted in the space.

The housing 10 may be formed of an insulating material. This is to prevent an unnecessary electrical connection to the external power source or load. In one embodiment, the housing 10 may be formed of a synthetic resin.

The space defined inside the housing 10 is electrically connected to the external power source or load. The electrical connection may be achieved by a wire member (not illustrated) or the like.

Although not illustrated, a cover (not illustrated) may be coupled to the housing 10. The cover (not illustrated) may be coupled to the housing 10 to cover an opening formed on one side of the housing 10, namely, a front side in the illustrated embodiment. Accordingly, the components accommodated in the inner space of the housing 10 cannot be arbitrarily exposed to outside.

The housing 10 includes a space portion 11.

The space portion 11 may be defined as a portion of the inner space of the housing 10. A device for receiving currents of a plurality of phases applied to the magnetic contactor 1 may be accommodated in the space portion 11.

The space portion 11 may be provided in plurality. The plurality of space portions 11 may be located adjacent to one another, but may be partitioned by is barrier ribs. In the illustrated embodiment, three space portions 11 are provided, to be physically spaced apart from one another by the barrier ribs interposed between the adjacent space portions 11.

The number of the space portion 11 may be determined depending on the number of phases of currents applied to the magnetic contactor 1. That is, it will be understood that currents of three different phases will be applied to the magnetic contactor 1 according to the illustrated embodiment.

The support plate 20 may be coupled to the movable plate 40. The support plate 20 may be rotated together with the movable plate 40. Accordingly, the movable plate 40 may be rotated in a direction toward the coil 30 or away from the coil 30 using the support plate 20 as a rotational shaft. The rotation is achieved by a magnetic field formed by the coil 30.

The support plate 20 extends in a widthwise direction of the housing 10, namely, in left and right directions in the illustrated embodiment. Both end portions of the support plate 20 in the extension direction, namely, both left and right end portions in the illustrated embodiment may be rotatably coupled to both left and right inner walls of the housing 10.

Accordingly, when current is applied to the coil 30 and electromagnetic force is generated, the movable plate 40 and the support plate 20 connected thereto may be rotated together.

The coil 30 forms an electromagnetic field for applying attractive force to the movable plate 40. The movable plate 40 may be rotated toward the coil 30 by electromagnetic force generated by the electromagnetic field formed by the coil 30.

The coil 30 may be implemented as any component or member capable of generating an electromagnetic field as current is applied.

The coil 30 is electrically connected to an external closing power source. Current for the coil 30 to form an electromagnetic field is transmitted from the closing power source. The coil 30 and the closing power source may be electrically connected by a wire member (not illustrated) or the like.

The movable plate 40 is rotated toward the coil 30 by the electromagnetic field and electromagnetic force formed by the coil 30. When the movable plate 40 is rotated, the latch assembly 50 may also be operated, such that the magnetic contactor 1 can be electrically connected to the external power source or load.

In addition, when current is applied to a trip coil unit 300 to be described later, the movable plate 40 may be rotated in a direction opposite to the coil 30. Accordingly, the latch assembly 50 may also be operated together, such that the magnetic contactor 1 can be electrically disconnected from the external power source or load.

The movable plate 40 may be formed of any material or configured as any member capable of receiving attractive force by an electromagnetic field or electromagnetic force. In one embodiment, the movable plate 40 may be formed of iron (Fe) or the like.

The movable plate 40 is coupled to the support plate 20. The movable plate 40 may be rotated together with the support plate 20.

In the illustrated embodiment, the movable plate 40 is formed in a shape of a rectangular plate that extends in the left and right directions and up and down directions. The movable plate 40 may be formed in any shape capable of being rotated by being attracted by the electromagnetic field and electromagnetic force formed by the coil 30.

After the movable plate 40 is rotated in the direction toward the coil 30, the position of the movable plate 40 may be maintained by a latch bearing 420 to be described later. A detailed description of the process will be given later.

3. Description of Configuration of Latch Assembly 50 According to Embodiment Referring to FIGS. 5 to 8, the magnetic contactor 1 according to the embodiment includes a latch assembly 50.

The latch assembly 50 is configured to switch the magnetic contactor 1, together with the coil 30 and the movable plate 40, to a closed state or a trip state.

Specifically, when current is applied to the coil 30, the rotated movable plate 40 is kept located at a rotated position by being supported by a latch bearing 420. At this time, the latch bearing 420 is rotated in a direction toward the coil 30 or the movable plate 40, namely, counterclockwise in the illustrated embodiment. Through the process, the magnetic contactor 1 is switched to the closed state.

At this time, a latch pin 410 and a trip lever 440 connected to the latch bearing 420 are also rotated counterclockwise to press an elastic member 450.

When the current applied to the coil 30 is cut off and current is applied to the trip coil unit 300, a movable core 200 is rotated in a direction toward the trip coil unit 300, namely, clockwise in the illustrated embodiment.

At this time, the trip lever 440 connected to the movable core 200 and the to latch bearing 420 connected to the trip lever 440 are also rotated counterclockwise. Accordingly, the movable plate 40 locked by the latch bearing 420 is unlocked so as to be rotated away from the coil 30. Through the process, the magnetic contactor 1 is switched to the trip state.

In order to switch the magnetic contactor 1 to the closed or trip state, the is movable core 200 and the latch unit 400 should be repeatedly rotated toward and away from the trip coil unit 300.

Even when the repeated switching to the closed state and the trip state is carried out, damage to each member of the latch assembly 50 can be minimized.

In addition, in the latch assembly 50 according to the embodiment of the present disclosure, when the movable core 200 is moved in the direction toward or away from the trip coil unit 300, the movable core 200 can be moved to an accurate position.

Hereinafter, the latch assembly 50 according to the embodiment will be described in detail, with reference to FIGS. 7 and 8.

In the illustrated embodiment, the latch assembly 50 includes a frame 100, a movable core 200, a trip coil unit 300, and a latch unit 400.

The frame 100 defines an outline of the latch assembly 50. The frame 100 supports the remaining components of the latch assembly 50. In addition, a space is defined inside the frame 100 to accommodate the other components constituting the latch assembly 50.

The frame 100 may be formed of a material having high stiffness. In one embodiment, the frame 100 may be formed of a metal material.

The frame 100 extends in one direction. In the illustrated embodiment, the frame 100 extends such that a length in front and rear directions is longer than a length in left and right directions.

The frame 100 rotatably supports the movable core 200 and the latch unit 400. The frame 100 is also coupled with the trip coil unit 300. In one embodiment, the trip coil unit 300 may be fixedly coupled to the frame 100.

In the illustrated embodiment, the frame 100 includes a first frame 110, a is second frame 120, a third frame 130, a fourth frame 140, a first space portion 150, and a second space portion 160.

The first frame 110 forms one side of the frame 100, namely, a rear side in the illustrated embodiment. In other words, the first frame 110 is located at the innermost portion of the frame 100.

In the illustrated embodiment, the first frame 110 is formed in a shape of a plate extending in left and right directions and up and down directions. One end portion of the first frame 110, namely, a lower end portion in the illustrated embodiment is continuous with the second frame 120.

The first frame 110 partially surrounds the first space portion 150. In the illustrated embodiment, the first frame 110 surrounds a rear side of the first space portion 150. Accordingly, the first frame 110 surrounds the trip coil unit 300 accommodated in the first space portion 150 from the rear.

The first frame 110 includes an insertion groove 111.

The third plate 230 of the movable core 200 is coupled through the insertion groove 111. In the state of being coupled through the insertion groove 111, the third plate 230 may be movable toward and away from the trip coil unit 300.

That is, the third plate 230 inserted through the insertion groove 111 functions as a rotational shaft of the movable core 200.

The insertion groove 111 extends in one of the directions in which the first frame 110 extends, namely, in the left and right directions in the illustrated embodiment. In other words, the insertion groove 111 is formed as a through hole that a length in the left and right directions is shorter than a length in the up and is down directions.

The insertion groove 111 is located adjacent to an upper end portion of the first frame 110. Accordingly, the movable core 200 partially coupled through the insertion groove 111 may be rotated above the trip coil unit 300.

The second frame 120 defines another side of the frame 100, namely, a lower side in the illustrated embodiment.

In the illustrated embodiment, the second frame 120 is formed in a shape of a plate extending in front and rear directions and left and right directions. One end portion of the second frame 120, namely, a lower end portion in the illustrated embodiment is continuous with the first frame 110. Another end portion of the second frame 120, namely, a front end portion in the illustrated embodiment is continuous with the third frame 130.

The second frame 120 partially surrounds the first space portion 150. In the illustrated embodiment, the second frame 120 surrounds a lower side of the first space portion 150. Accordingly, the second frame 120 surrounds the trip coil unit 300 accommodated in the first space portion 150 from the lower side.

The second frame 120 supports the trip coil unit 300 from the lower side. In one embodiment, the trip coil unit 300 may be mounted on the second frame 120.

The second frame 120 is provided with a hole formed therethrough in a thickness direction, namely, in the up and down directions in the illustrated embodiment. A coupling member 320 of the trip coil unit 300 is coupled through the hole.

The third frame 130 defines still another side of the frame 100, namely, a front lower side in the illustrated embodiment.

In the illustrated embodiment, the third frame 130 is formed in a shape of a plate extending in the front and rear directions and the left and right directions. One end portion of the third frame 130, namely, a lower end portion in the illustrated embodiment is continuous with the second frame 120. Other end portions of the third frame 130, namely, left and right end portions in the illustrated embodiment are continuous with the fourth frame 140.

The third frame 130 partially surrounds the second space portion 160. In the illustrated embodiment, the third frame 130 surrounds a lower side of the second space portion 160. Accordingly, the third frame 130 surrounds the latch unit 400 accommodated in the second space portion 160 from the lower side.

The fourth frame 140 defines still another sides of the frame 100, namely, front left and front right sides in the illustrated embodiment.

In the illustrated embodiment, the fourth frame 140 is formed in a shape of a plate extending in the front and rear directions and the up and down directions. One end portion of the fourth frame 140, namely, a lower end portion in the illustrated embodiment is continuous with the third frame 130.

The fourth frame 140 may be provided in plurality. The plurality of fourth frames 140 may be spaced apart from each other. In the illustrated implementation, two fourth frames 140 may be disposed to be spaced apart from each other. The two fourth frames 140 are continuous with the left and right end portions of the third frame 130, respectively.

The fourth frames 140 partially surround the second space portion 160. In the illustrated embodiment, the fourth frames 140 surround left and right sides of the second space portion 160. Accordingly, the fourth frames 140 surround the latch unit 400 accommodated in the second space portion 160 from the left and is right sides.

The latch unit 400 is rotatably coupled to one of the plurality of fourth frames 140. In the illustrated embodiment, the latch unit 400 is rotatably coupled to the fourth frame 140 located on the right side.

An insertion hole 141 and a support hole (reference numerals not illustrated) are formed through the one fourth frame 140 in the thickness direction, namely, in the left and right directions in the illustrated embodiment. The latch unit 400 is rotatably or slidingly coupled to the insertion hole 141 and the support hole.

Specifically, a latch pin 410 of the latch unit 400 is slidably coupled to the insertion hole 141. That is, the latch pin 410 may be slidable in a direction toward and away from the movable core 200, namely, up and down in the illustrated embodiment, while being coupled through the insertion hole 141.

As will be described later, the latch unit 400 is rotated centering on a shaft member 460. Accordingly, the insertion hole 141 extends in the up and down directions to be convexly rounded in a direction opposite to the shaft member 460, in other words, in a direction toward the trip coil unit 300.

Accordingly, the insertion hole 141 can limit a moving distance of the latch pin 410 and guide a movement of the latch pin 410. Thus, the rotation of the latch unit 400 can be stably performed.

The support hole is located to face the trip coil unit 300 with the insertion hole 141 interposed therebetween. That is, the support hole is located farther apart from the trip coil unit 300 than the insertion hole 141. In the illustrated embodiment, the support hole 230 is located at the front side of the insertion hole 141.

The support hole is formed through the one of the fourth frames 140 in is the thickness direction. The shaft member 460 of the latch unit 400 is coupled through the support hole. The shaft member 460 may be rotated clockwise or counterclockwise while being inserted through the support hole.

The first to fourth frames 110, 120, 130, and 140 may be continuous with each other at predetermined angles. In one embodiment, the first to fourth frames 110, 120, 130, and 140 may extend perpendicularly with respect to other consecutive frames.

The first space portion 150 is a space accommodating the trip coil unit 300. The first space portion 150 may be defined as a space partially surrounded by the first frame 110, the second frame 120, and the movable core 200.

Specifically, one side of the first space portion 150, namely, a rear side in the illustrated embodiment is surrounded by the first frame 110. Another side of the first space portion 150, namely, a lower side in the illustrated embodiment is surrounded by the second frame 120. Still another side of the first space portion 150, namely, an upper side in the illustrated embodiment is surrounded by the movable core 200.

That is, the other sides of the first space portion 150, namely, left, right and front sides in the illustrated embodiment are open.

A size of the first space portion 150 may be determined depending on a size of the trip coil unit 300.

The second space portion 160 is a space accommodating the latch unit 400. The latch unit 400 may be rotated clockwise or counterclockwise while being accommodated in the second space portion 160. The second space portion 160 may be defined as a space partially surrounded by the third frame 130 and the fourth frame 140.

Specifically, one side of the second space portion 160, namely, a lower side in the illustrated embodiment is surrounded by the third frame 130. Both lateral sides of the second space portion 160, namely, left and right sides in the illustrated embodiment are surrounded by the fourth frame 140.

That is, the other sides of the second space portion 160, namely, front, rear, and upper sides in the illustrated embodiment are open.

A size of the second space portion 160 may vary depending on a size of the latch unit 400.

The movable core 200 is rotated in a direction toward the trip coil unit 300 or in a direction opposite to the trip coil unit 300 by the electromagnetic field and electromagnetic force generated by the trip coil unit 300.

By the movement of the movable core 200, the magnetic contactor 1 can be operated in the closed state or the trip state. It will be understood that the operation of the movable core 200 is performed together with the operation of the movable plate 40.

The movable core 200 may be rotatably coupled to the frame 100. The movable core 200 may be rotated clockwise or counterclockwise while being coupled to the frame 100.

The movable core 200 may extend in one direction, namely, in the front and rear directions in the illustrated implementation. It will be understood that the to direction is the same as the direction in which the frame 100 extends.

The movable core 200 is disposed to face the second frame 120 with the trip coil unit 300 interposed therebetween. As described above, in the illustrated embodiment, since the second frame 120 is located below the trip coil unit 300, the movable core 200 is located above the trip coil unit 300.

The movable core 200 is located to cover another side of the first space portion 150, namely, the upper side in the illustrated embodiment.

The movable core 200 may be formed of a magnetic material. This is to receive electromagnetic force by an electromagnetic field that is formed as current is applied to the trip coil unit 300. In one embodiment, the movable core 200 may be formed of a material such as iron (Fe) or copper (Cu).

The movable core 200 is coupled to the trip coil unit 300. Specifically, the movable core 200 is movably coupled by the coupling member 320 of the trip coil unit 300. That is, the vertical movement of the movable core 200 is guided by the coupling member 320.

Accordingly, when the movable core 200 is moved in a direction toward or opposite to the trip coil unit 300, the movable core 200 may be moved along a preset path. This can improve reliability of the operation of the movable core 200.

In this implementation, the movable core 200 includes a first plate 210, a second plate 220, and a third plate 230.

The first plate 210 is located at an upper side of the trip coil unit 300. The first plate 210 is located to cover the first space portion 150.

The first plate 210 extends in one direction, namely, in the front and rear directions and the left and right directions in the illustrated embodiment. It will be understood that the extension direction of the first plate 210 is the same as the extension direction of the second frame 120.

A through hole 211 is formed through the first plate 210.

The through hole 211 is a space through which the coupling member 320 of the trip coil unit 300 is inserted. The through hole 211 is formed through the first plate 210 in the thickness direction of the first plate 210, namely, in the up and down (vertical) direction in the illustrated embodiment.

A center of the through hole 211 may be coaxial with a center of the hollow portion 310 of the trip coil unit 300. That is, in a state in which the movable core 200 is attracted to the trip coil unit 300, the centers of the through hole 211 and the hollow portion 310 may be located on the same straight line.

A cross-sectional area of the through hole 211 may be larger than that of a bolt part 321 of the coupling member 320. As described above, this is to secure a tolerance according to the change in angle between the hollow portion 310 and the through hole 211 since the movable core 200 rotates around the insertion groove 111.

In the illustrated embodiment, the through hole 211 may have a circular cross-section. The shape of the through hole 211 may be formed in any shape through which the coupling member 320 can be coupled.

One end portion of the first plate 210, namely, a front end portion in the illustrated embodiment is continuous with the second plate 220. Another end portion of the first plate 210, namely, a rear end portion in the illustrated embodiment is continuous with the third plate 230.

The second plate 220 presses the latch pin 410 of the latch unit 400 as the movable core 200 rotates toward the trip coil unit 300. When the second plate 220 presses the latch pin 410, the latch pin 410 is moved downward while being rotated in a direction toward the third frame 130, namely, clockwise in the illustrated embodiment.

Accordingly, the movable plate 40 is unlocked from the latch bearing 420, and the magnetic contactor 1 can thusly be switched to the trip state.

Also, when the movable core 200 is rotated in an opposite direction to the is trip coil unit 300, the second plate 220 is spaced apart from the latch pin 410. In addition, the latch pin 410 and the latch bearing 420 connected thereto are rotated by restoring force of the elastic member 450, so that the movable plate attracted by the coil 30 is locked in the latch bearing 420. Accordingly, the magnetic contactor 1 can be switched to the closed state.

The second plate 220 may be formed in any shape that is capable of pressing the latch pin 410 or being spaced apart from the latch pin 410, in response to the rotation of the movable core 200.

In the illustrated embodiment, the second plate 220 includes a first portion continuous with the first plate 210, a second portion extending from the first portion in a direction toward the latch pin 410 while forming a predetermined angle with the first portion, and a third portion continuously extending from the second portion in a direction opposite to the trip coil unit 300 while forming a predetermined angle with the second portion.

It will be understood that the latch pin 410 is pressed or released by the third portion.

In one embodiment, the predetermined angles each formed between the first portion and the second portion and between the second portion and the third portion may be a right angle.

The third plate 230 is rotatably coupled to the first frame 110. Specifically, one end portion of the third plate 230 facing the first frame 110, namely, a rear end portion in the illustrated embodiment is inserted into the insertion groove 111 that is formed through the first frame 110.

The third plate 230 is continuous with the first plate 210. In the illustrated embodiment, the third plate 230 is continuous with another side of the first plate 210 facing the first frame 110, namely, a rear side in the illustrated embodiment.

In one embodiment, the third plate 230 and the first plate 210 may be horizontally continuous with each other.

In the illustrated embodiment, a length of the third plate 230 in the left and right directions is longer than a length in the front and rear directions. The shape of the third plate 230 may vary depending on the shape of the insertion groove 111.

The third plate 230 may be rotated in the directions toward and away from the trip coil unit 300, namely, clockwise or counterclockwise in the illustrated embodiment, while being inserted through the insertion groove 111.

Accordingly, the first plate 210 and the second plate 220 continuously formed with the third plate 230 can be rotated toward and away from the trip coil unit 300.

In response to the rotation, the magnetic contactor 1 can be switched to the closed state or the trip state.

The trip coil unit 300 receives current from an external trip power source. The trip coil unit 300 forms an electromagnetic field according to the applied current. The formed electromagnetic force generates electromagnetic force that attracts the movable core 200 toward the trip coil unit 300.

The trip coil unit 300 is electrically connected to the external trip power source. The electrical connection may be achieved by a wire member (not illustrated) or the like.

The trip coil unit 300 is accommodated in the frame 100. Specifically, the trip coil unit 300 is accommodated in the first space portion 150 defined inside the frame 100.

The trip coil unit 300 is coupled to the frame 100. Specifically, the trip coil unit 300 is coupled to the second frame 120 by the coupling member 320. In one embodiment, the trip coil unit 300 may be fixedly coupled to the second frame 120.

The trip coil unit 300 may include a plurality of coils therein. That is, the trip coil unit 300 may include a plurality of coils and a bobbin around which the plurality of coils are wound.

In the illustrated embodiment, the trip coil unit 300 is formed in a cylindrical shape that has a circular cross-section, extends vertically, and has the hollow portion 310 therein. The trip coil unit 300 may be formed in an arbitrary shape that is electrically connected to the external trip power source to form an electromagnetic field using the received current.

In the illustrated embodiment, the trip coil unit 300 includes a hollow portion 310, a coupling member 320, and a return member 330.

The hollow portion 310 is formed through the trip coil unit 300 in a height direction of the trip coil unit 300. In the illustrated embodiment, the hollow portion 310 is formed through the trip coil unit 300 having the cylindrical shape in the vertical direction of the trip coil unit 300.

A bolt part 321 of the coupling member 320 is coupled through the hollow portion 310. One end portion of the bolt part 321 inserted into the hollow portion 310 may be located on an upper side of the first plate 210, and another end portion of the bolt part 321 may be located on a lower side of the second frame 120.

An inner cross-section of the hollow portion 310 may vary depending on a height of the hollow portion 310. That is, the hollow portion 310 may have a is cross-section that an area in a direction toward the movable core 200, namely, an area of an upper side in the illustrated embodiment is wider than an area in a direction toward the second frame 120, namely, an area of a lower side in the illustrated embodiment.

The return member 330 may be accommodated in a cross-section of the upper side of the hollow portion 310. Therefore, when the magnetic contactor 1 is switched to the trip state, the return member 330 can be pressed by the movable core 200.

Therefore, when the magnetic contactor 1 is switched back to the closed state, the movable core 200 can be more effectively moved away from the trip coil unit 300 by restoring force applied by the return member 330.

The center of the hollow portion 310 may be coaxial with the center of the through hole 211 formed through the first plate 210. Accordingly, when the coupling member 320 is coupled through the through hole 211 and the hollow portion 310, the movable core 200 can be rotated along a preset path.

This can improve the operational reliability of the magnetic contactor 1.

In one embodiment, a screw thread may be formed on an inner circumferential surface of the trip coil unit 300 that surrounds the hollow portion 310. The bolt part 321 coupled through the hollow portion 310 may be coupled to the screw thread.

In the illustrated embodiment, the cross section of the hollow portion 310 is formed in a circular shape. The cross section of the hollow portion 310 may have any shape through which the coupling member 320 can be coupled.

The coupling member 320 couples the movable core 200 and the trip coil unit 300 to each other. Accordingly, the movable core 200 can be coupled to the is trip coil unit 300 such that its shortest distance to the trip coil unit 300 can be adjusted.

Also, the coupling member 320 couples the trip coil unit 300 and the frame 100 to each other. Accordingly, the trip coil unit 300 can be stably coupled to the frame 100, thereby preventing unnecessary trembling of the trip coil unit 300.

In the illustrated embodiment, the coupling member 320 includes a bolt part 321 and a nut part 322.

The bolt part 321 is coupled through the frame 100, the movable core 200, and the trip coil unit 300 to couple the frame 100, the movable core 200, and the trip coil unit 300 together.

Specifically, the bolt part 321 is coupled sequentially through the movable core 200, the trip coil unit 300, and the frame 100 from top to bottom. At this time, it will be understood that the bolt part 321 is sequentially coupled through to the through hole 211, the hollow portion 310, and the hole of the second frame 120.

The bolt part 321 extends in one direction, namely, in the up and down (vertical) direction in the illustrated embodiment. It will be understood that the extension direction is the same as the direction in which the hollow portion 310 extends.

In the illustrated embodiment, the bolt part 321 may be formed in a cylindrical shape having a circular cross section and extending in the up and down directions. A screw thread may be formed on an outer circumferential surface of the bolt part 321. A nut part 322 to be described below may be coupled to the outer circumferential surface of the bolt part 321.

The bolt part 321 may have any shape that can be sequentially coupled through the through hole 211, the hollow portion 310, and the hole of the second is frame 120.

One end portion of the bolt part 321, which is adjacent to the movable core 200, of both end portions in the extension direction of the bolt part 321, namely, an upper end portion in the illustrated embodiment may be exposed to the top of the first plate 210.

In the illustrated embodiment, the nut part 322 is assembled to the upper end portion of the bolt part 321. In the embodiment, a distance by which the movable core 200 is rotated may be determined depending on a position where the nut part 322 is assembled to the bolt part 321.

Therefore, the shortest distance between the nut part 322 assembled to the upper end portion of the bolt part 321 and the first plate 210 may be equal to or longer than a distance by which the latch pin 410 should be moved for the latch unit 400 to be switched to the closed state or the trip state.

In other words, the shortest distance between the nut part 322 and the first plate 210 may be equal to or longer than a length of a chord of the insertion hole 141 that is formed in the fourth frame 140.

Therefore, the movement of the movable core 200 can interoperate with the latch unit 400, such that the switching to the closed state and the trip state can be carried out effectively and stably.

Alternatively, the bolt part 321 may be formed in a shape having a screw head. Even in the embodiment, it is preferable that the shortest distance between the screw head and the first plate 210 is determined according to the above-described conditions.

Another end portion of the bolt part 321, which is adjacent to the second is frame 120, of the both end portions in the extension direction of the bolt part 321, namely, a lower end portion in the illustrated embodiment may be exposed to the bottom of the second plate 120.

In the illustrated embodiment, the nut part 322 is assembled to the lower end portion of the bolt part 321.

The nut part 322 is coupled to the bolt part 321 such that the movable core 200 and the trip coil part 300 are coupled to each other. In addition, the nut part 322 is coupled to the bolt part 321 such that the trip coil unit 300 and the second frame 120 are coupled to each other.

In one embodiment, the nut part 322 may be screwed to the bolt part 321. A hollow hole is formed inside the nut part 322, so that the bolt part 321 can be coupled therethrough. A screw thread that is screwed with a screw thread formed on an outer circumferential surface of the bolt part 321 may be formed on an inner circumferential surface of the nut part 322 that surrounds the hollow hole.

The nut part 322 may be provided in plurality. The plurality of nut parts 322 may be coupled to the bolt part 321 at different locations along the extension direction of the bolt part 321.

In the illustrated embodiment, two nut parts 322 are provided and coupled to upper and lower end portions of the bolt part 321, respectively.

At this time, the nut part 322 coupled to the upper end portion of the bolt part 321 may be spaced apart from the first plate 210 by a predetermined distance. A criterion for determining the shortest distance between the nut part 322 and the first plate 210 is as described above.

Accordingly, the coupling member 320 may couple the movable core 200 to be rotatable relative to the trip coil unit 300.

In addition, the nut part 322 coupled to the lower end portion of the bolt part 321 may come into contact with a lower surface of the second frame 120.

Accordingly, the coupling member 320 may fix the trip coil unit 300 to the frame 100.

The movable core 200 is also moved in a direction toward the trip coil unit 300 or in a direction away from the trip coil unit 300 while the coupling member 320 is coupled therethrough. Accordingly, since the movable core 200 is rotated along a preset path, the operational reliability of the magnetic contactor 1 can be improved.

The return member 330 provides restoring force for the movable core 200 to move in a direction opposite to the trip coil unit 300.

Specifically, when current is applied to the trip coil unit 300 to form an electromagnetic field, the movable core 200 is moved toward the trip coil unit 300 by the generated electromagnetic force.

At this time, as the movable core 200 is moved, the return member 330 is pressed and deformed to store restoring force.

When the current applied to the trip coil unit 300 is cut off, the return member 330 returns to its original shape and presses the movable core 200. Accordingly, the movable core 200 can be returned to its original position without any other movable means, such that the magnetic contactor 1 can be switched to the closed state.

The return spring 330 may be configured as any member which is deformable to store the restoring force and returns to its original state to transfer the restoring force to another member. In the illustrated embodiment, the return member 330 is configured as a coil spring with a hollow hole inside.

The return member 330 is accommodated in the trip coil unit 300. Specifically, the return member 330 is inserted into the hollow portion 310 formed inside the trip coil unit 300.

The return member 330 extends in the same direction as the direction in which the hollow portion 310 extends, namely, in the vertical direction in the illustrated embodiment.

The return member 330 may be configured such that one end portion facing the movable core 200 of both end portions in the extension direction of the return member 330, namely, an upper end portion in the illustrated embodiment is exposed to the top of the trip coil unit 300. In other words, the upper end portion of the return member 330 may be located between the first plate 210 of the movable core 200 and the upper surface of the trip coil unit 300.

A cross-sectional area of the return member 330 may be smaller than or equal to a cross-sectional area of one portion of the hollow portion 310 facing the movable core 200, namely, an upper side of the hollow portion 310 in the illustrated embodiment. In addition, the cross-sectional area of the return member 330 may be larger than that of another portion of the hollow portion 310 facing the second frame 120, namely, a lower side of the hollow portion 310 in the illustrated embodiment.

Furthermore, the cross-sectional area of the return member 330 may be larger than that of the through hole 211 formed through the first plate 210. Accordingly, the return member 330 may be pressed by the first plate 210 that is rotated toward the trip coil unit 300.

Accordingly, the return member 330 can be accommodated in the one portion of the hollow portion 310 and supported by an inner circumferential is surface surrounding the another portion of the hollow portion 310.

A detailed description of a process in which the return member 330 is compressed by the movement of the movable core 200 and the movable core 200 returns to its initial state by the compressed return member 330 will be described later.

When the magnetic contactor 1 is switched to the closed state, the latch unit 400 locks the moved movable plate 40 such that the movable plate 40 maintains its position. Also, when the magnetic contactor 1 is switched to the trip state, the latch unit 400 is moved by interoperating with the movement of the movable core 200 to unlock the movable plate 40.

The latch unit 400 is rotatably coupled to the frame 100. The latch unit 400 may be rotatable clockwise or counterclockwise. The rotation may be achieved by the movable core 200 and the elastic member 450.

The latch unit 400 is located adjacent to the movable core 200 and the trip coil unit 300. In the illustrated embodiment, the latch unit 400 is located at the front side of the movable core 200 and the trip coil unit 300.

The latch unit 400 is brought into contact with or spaced apart from the movable core 200. Specifically, when current is applied to the trip coil unit 300 such that the movable core 200 is moved toward the trip coil unit 300, the latch unit 400 is brought into with the movable core 200.

When the current applied to the trip coil unit 300 is cut off such that the movable core 200 is moved away from the trip coil unit 300, the latch unit 400 is spaced apart from the movable core 200.

The latch unit 400 may be rotatable clockwise or counterclockwise. At this time, the rotation of the latch unit 400 is responsive to the rotation of the movable core 200. That is, the latch unit 400 may be rotated in the same direction as the movable core 200.

In the illustrated embodiment, the latch unit 400 includes a latch pin 410, a latch bearing 420, a connection member 430, a trip lever 440, an elastic member 450, a shaft member 460, and a latch 470.

The latch pin 410 is pressed and rotated by the movable core 200. In addition, the latch pin 410 is rotated by the restoring force that the elastic member 450 applies. As the latch pin 410 is rotated, the latch bearing 420 connected to the latch pin 410 is also rotated, such that the magnetic contactor 1 can be maintained in the closed state or the trip state.

The latch pin 410 is rotatably coupled to the frame 100. Specifically, the latch pin 410 is coupled through the insertion hole 141 formed through the fourth frame 140. The latch pin 410 may be moved clockwise or counterclockwise along the insertion hole 141 by the movable core 200 and the elastic member 450.

The latch pin 410 extends in one direction. In the illustrated embodiment, the latch pin 410 extends in the left and right directions.

One end portion of the latch pin 410, which is coupled through the insertion hole 141, of both end portions in the extension direction of the latch pin 410, namely, a right end portion in the illustrated embodiment may be exposed to the outside of the fourth frame 140.

Accordingly, the latch pin 410 can be slid along the insertion hole 141 without being arbitrarily separated from the insertion hole 141.

The latch pin 410 is brought into contact with or spaced apart from the second plate 220 of the movable core 200.

Specifically, when the magnetic contactor 1 is switched to the closed state, is the movable core 200 is located at the upper side by the elastic force of the return member 330. At this time, the latch pin 410 is kept located at the upper side by the elastic force of the elastic member 450. In this state, the latch pin 410 is spaced apart from the movable core 200.

Also, when the magnetic contactor 1 is switched to the trip state, the movable core 200 is moved downward by the electromagnetic force formed by the trip coil unit 300. At this time, the second plate 220 of the movable core 200 is moved while pressing the latch pin 410 downward. In this state, the latch pin 410 is brought into contact with the movable core 200.

The latch pin 410 is connected to the latch bearing 420. Specifically, another end portion of the latch pin 410 in the extension direction of the latch pin 410, namely, a left end portion in the illustrated embodiment is connected to the latch bearing 420. The latch pin 410 may be rotated along with the latch bearing 420.

The latch bearing 420 is rotated together with the latch pin 410 to be coupled to or separated from the movable plate 40. When the latch bearing 420 is coupled to the movable plate 40, the movable plate 40 can be locked at the moved position. Accordingly, the magnetic contactor 1 can be switched to the closed state.

When the movable core 200 is moved in the direction toward the trip coil to unit 300, the latch bearing 420 unlocks the movable plate 40. Accordingly, the movable plate 40 can return to the position before the closed state, and thus the magnetic contactor 1 can be switched to the trip state.

In addition, the latch bearing 420 performs a link fit between the latch pin 410 and the connection member 430. When the latch pin 410 is rotated downward, is the latch bearing 420 transmits the movement to the connection member 430.

Accordingly, the movement of the latch pin 410 may be transferred to the connection member 430 and the trip lever 440 connected to the connection member 430.

The latch bearing 420 is rotatably coupled to the connection member 430. In the illustrated embodiment, the latch bearing 420 is rotatably coupled to a rear end portion of the connection member 430 so as to be rotated along with the connection member 430.

Accordingly, when the latch pin 410 and the latch bearing 420 are rotated clockwise or counterclockwise, the connection member 430 can be rotated together with the latch pin 410 and the latch bearing 420 without being rotated by itself.

The connection member 430 transfers the movement of the latch pin 410 to the trip lever 440. Accordingly, the rotation of the trip lever 440 may interoperate with the rotation of the latch pin 410.

The connection member 430 extends in one direction, namely, in the front and rear directions in the illustrated embodiment. In the illustrated embodiment, the connection member 430 is formed in a plate shape extending in the front and rear directions and the up and down directions.

One end portion of the connection member 430, namely, the rear end to portion in the illustrated embodiment is rotatably coupled to the latch bearing 420. Another end portion of the connection member 430, namely, a front end portion in the illustrated embodiment is coupled to the trip lever 440.

The connecting member 430 may be rotated clockwise or is counterclockwise together with the latch bearing 420 and the trip lever 440.

The trip lever 440 is provided for an operator to manually manipulate the latch unit 400. The trip lever 440 is rotated clockwise or counterclockwise together with the latch pin 410, the latch bearing 420, and the connection member 430.

In the illustrated embodiment, the trip lever 440 is formed in a plate shape extending in the left and right directions and the up and down directions. The trip lever 440 may be formed in a shape capable of maximizing its cross-sectional area. This is to facilitate the operator to manipulate the latch unit 400 using a finger or the like.

The trip lever 440 is coupled to the connection member 430. The trip lever 440 may be rotated clockwise or counterclockwise together with the connection member 430.

The trip lever 440 is coupled to the shaft member 460. The trip lever 440 may be rotated together with the shaft member 460. At this time, as the trip lever 440 is rotated, the elastic member 450 coupled through the shaft member 460 may be compressed or tensioned.

The elastic member 450 supplies restoring force for restoring the latch unit 400 rotated by the rotation of the movable core 200 to its original position.

Figure 7:
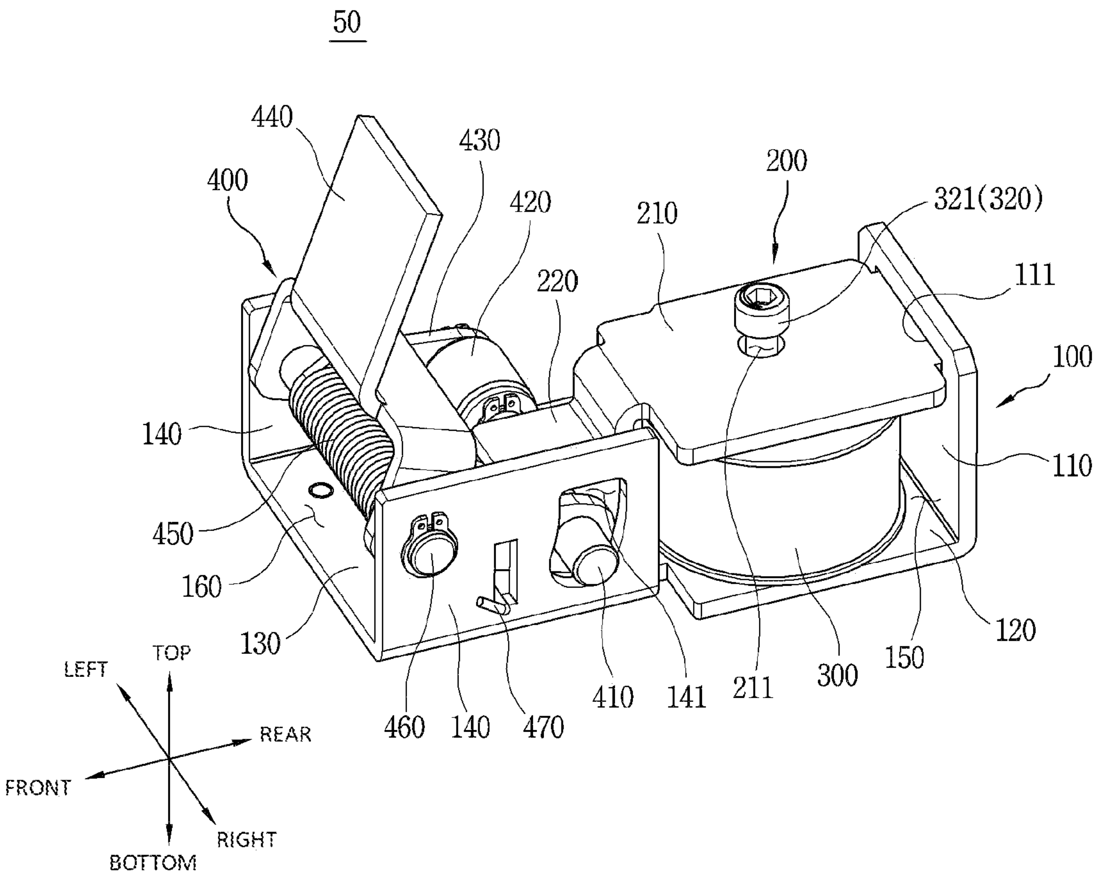
FIG. 7 is a perspective view illustrating a trip state of the latch assembly provided in the magnetic contactor of FIG. 5.

Specifically, in the embodiment illustrated in FIG. 7, the elastic member 450 is pressed by the movements of the latch pin 410, the latch bearing 420, the connection member 430, and the trip lever 440. Accordingly, the elastic portion 450 is deformed and stores the restoring force.

Figure 8:
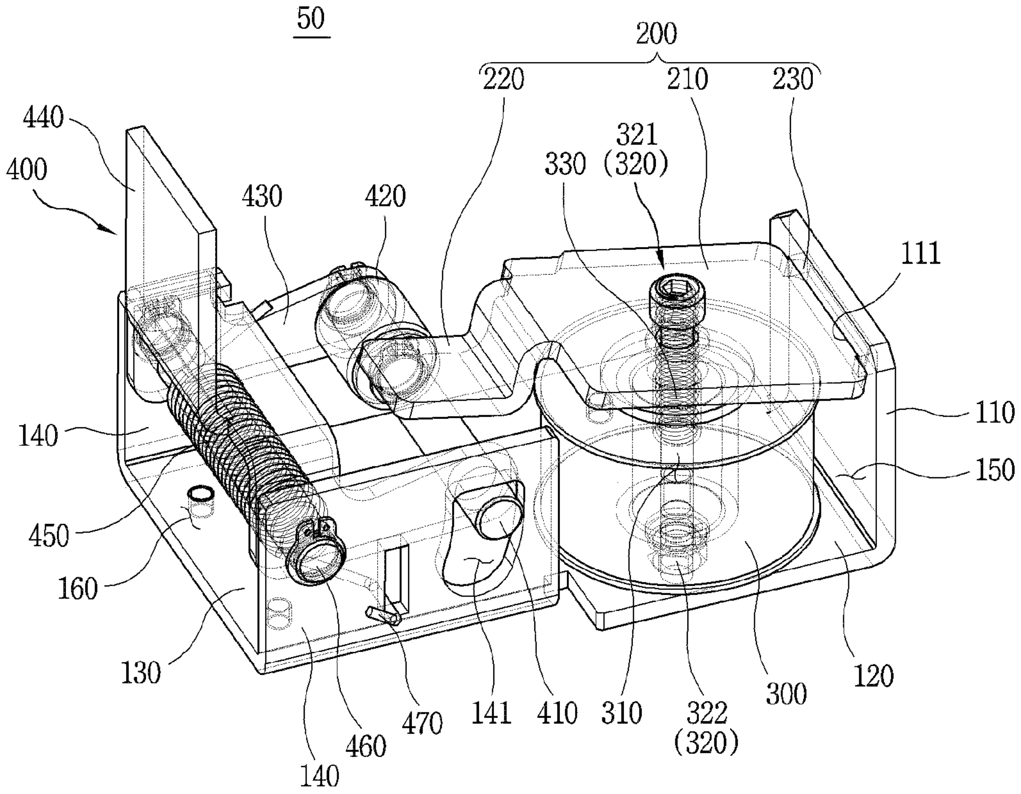
FIG. 8 is a perspective view illustrating a closed state of the latch assembly of FIG. 7.

In addition, in the embodiment illustrated in FIG. 8, the latch pin 410, the latch bearing 420, the connection member 4300, and the trip lever 440 are located at an initial state, that is, the closed state. In this state, the elastic member 450 is not deformed.

That is, in the illustrated embodiment, the elastic member 450 stores the restoring force by being deformed when the latch unit 400 is rotated clockwise, and returns to its original shape by transmitting the stored restoring force to another member when the latch unit 400 is rotated counterclockwise.

The elastic member 450 may be configured as an arbitrary member that is capable of storing the restoring force by deformation due to rotation and applying the stored restoring force to another member. In the illustrated embodiment, the return member 450 is configured as a torsion spring.

A detailed description of a process in which the elastic member 450 is pressed by the rotation of the latch unit 400 and the latch unit 400 is rotated by the restoring force stored in the elastic member 450 will be described later.

The shaft member 460 functions as a shaft of the rotation of the latch unit 400. That is, the latch pin 410, the latch bearing 420, the connection member 430, and the trip lever 440 are rotated centering on the shaft member 460.

The shaft member 460 is rotatably coupled to the frame 100. Specifically, the shaft member 460 is coupled through the insertion hole 141 formed through the fourth frame 140. The shaft member 460 may be rotated clockwise or counterclockwise while being coupled through the insertion hole 141.

The shaft member 460 is coupled to the connection member 430 and the trip lever 440. The shaft member 460 may be rotated together with the connection member 430 and the trip lever 440.

The elastic member 450 is coupled to the shaft member 460. Specifically, the shaft member is coupled through a hollow portion formed inside the elastic member 450.

In the illustrated embodiment, the shaft member 460 may have a circular cross-section and extend in the left and right directions. The shape of the shaft member 460 may vary depending on the shape of the hollow portion formed inside the elastic member 450.

The latch 470 couples the latch unit 400 to the frame 100. Due to the latch 470, the latch unit 400 and the frame 100 are not separated arbitrarily.

The latch 470 is detachably coupled to the frame 100. Specifically, the latch 470 is coupled through a groove formed in the fourth frame 140.

In the illustrated embodiment, the latch 470 extends in the left and right directions. One end portion of the latch 470, which is coupled through the groove, of both end portions in the extension direction of the latch 410, namely, a right end portion in the illustrated embodiment may be exposed to the outside of the fourth frame 140.

The latch 470 may be rotated while being coupled through the groove. In addition, a bent portion may be formed on the end portion of the latch 470. Therefore, when the latch unit 400 is coupled to the frame 100 and the latch 470 is rotated, the latch 470 is not arbitrarily pulled out from the groove by the bent portion.

This can stably maintain the coupled state between the latch unit 400 and the frame 100.

4. Description of Process of Operating Latch Assembly 50 According to Embodiment In the latch assembly 50 according to the embodiment, the movable core 200 may be moved along a preset path. In addition, the latch assembly 50 according to the embodiment can prevent damage to other members when the magnetic contactor 1 is switched to the closed state or the trip state.

This can improve operational reliability and increase durability of the latch assembly 50 and the magnetic contactor 1 including the same.

Hereinafter, a process of switching to the trip state and the closed state in the magnetic contactor 1 including the latch assembly 50 according to the embodiment will be described in detail, with reference to FIGS. 9 and 10.

In the illustrated embodiment, it will be understood that components other than the latch assembly 50 are omitted for convenience of understanding.

Figure 9:
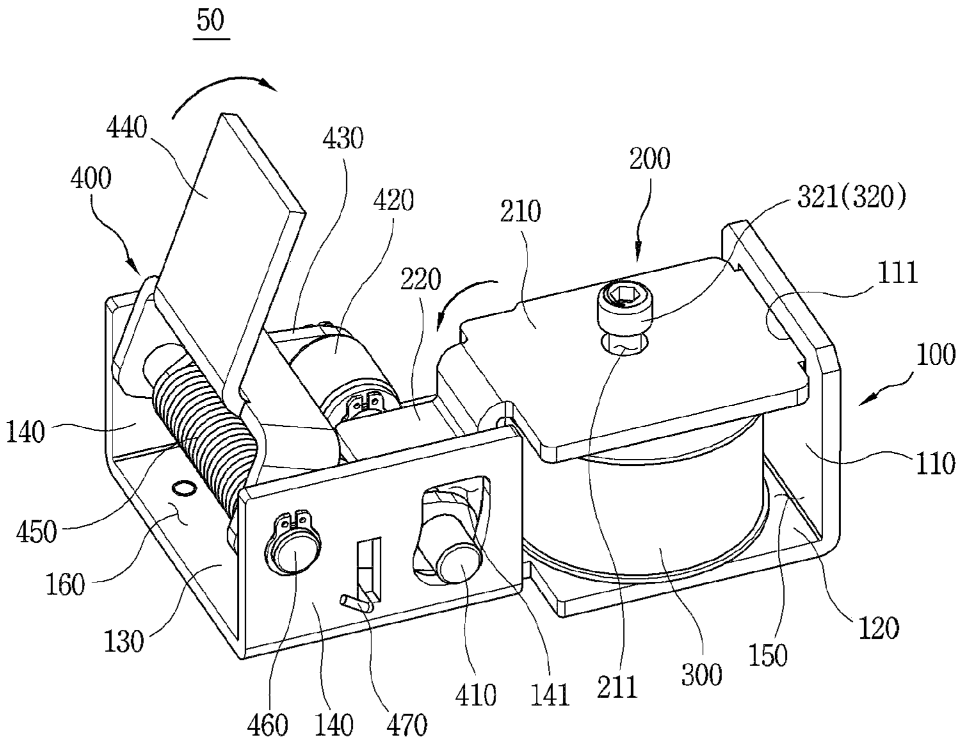
FIGS. 9 and 10 are status views illustrating a process of operating the latch assembly in accordance with the embodiment of the present disclosure.

Referring to FIG. 9, the latch unit 400 when the magnetic contactor 1 is switched to the trip state is illustrated.

In this state, current is applied to the trip coil unit 300 from the trip power source. Accordingly, the trip coil unit 300 forms an electromagnetic field. The electromagnetic field formed by the trip coil unit 300 generates attractive force that attracts the movable core 200.

The movable core 200 is then moved toward the trip coil unit 300. At this time, the movable core 200 is rotatably coupled to the first frame 110 through the third plate 230.

Accordingly, the movable core 200 is rotated in a direction toward the trip coil unit 300, namely, in a counterclockwise direction in the illustrated embodiment, centering on the third plate 230.

In the process, the first plate 210 is rotated while pressing the return member 330 located below the first plate 210.

In addition, the coupling member 320 is inserted through the through hole 211 of the first plate 210. Accordingly, the first plate 210 is rotated while the coupling member 320 is inserted through the through hole 211.

Accordingly, the movable core 200 can be rotated along a preset path toward the trip coil unit 300 without shaking in the left and right directions or the front and rear directions.

The second plate 220 is also rotated counterclockwise along with the first plate 210. At this time, the second plate 220 is rotated while pressing the latch pin 410 after being rotated by a predetermined distance.

Accordingly, the latch pin 410 is rotated clockwise centering on the shaft member 460.

At this time, the latch pin 410 is rotated while its end is inserted into the insertion hole 141. Accordingly, the latch pin 410 is guided and moved by an inner surface of the fourth frame 140 surrounding the insertion hole 141.

As the latch pin 410 is rotated, the latch bearing 420, the connection member 430, the trip lever 440, and the shaft member 460 which are all connected to the latch pin 410 are also rotated clockwise. At this time, the elastic member 450 stores restoring force while being deformed by pressure applied from those members.

The maximum distance by which the latch pin 410 is rotated may be determined according to the position of the lower end portion of the insertion hole 141. That is, the latch pin 410 may be moved clockwise until it comes into contact with the lower end portion of the insertion hole 141.

Accordingly, the operation of the latch assembly 50 is completed, and the magnetic contactor 1 can be switched to the trip state.

Figure 10:
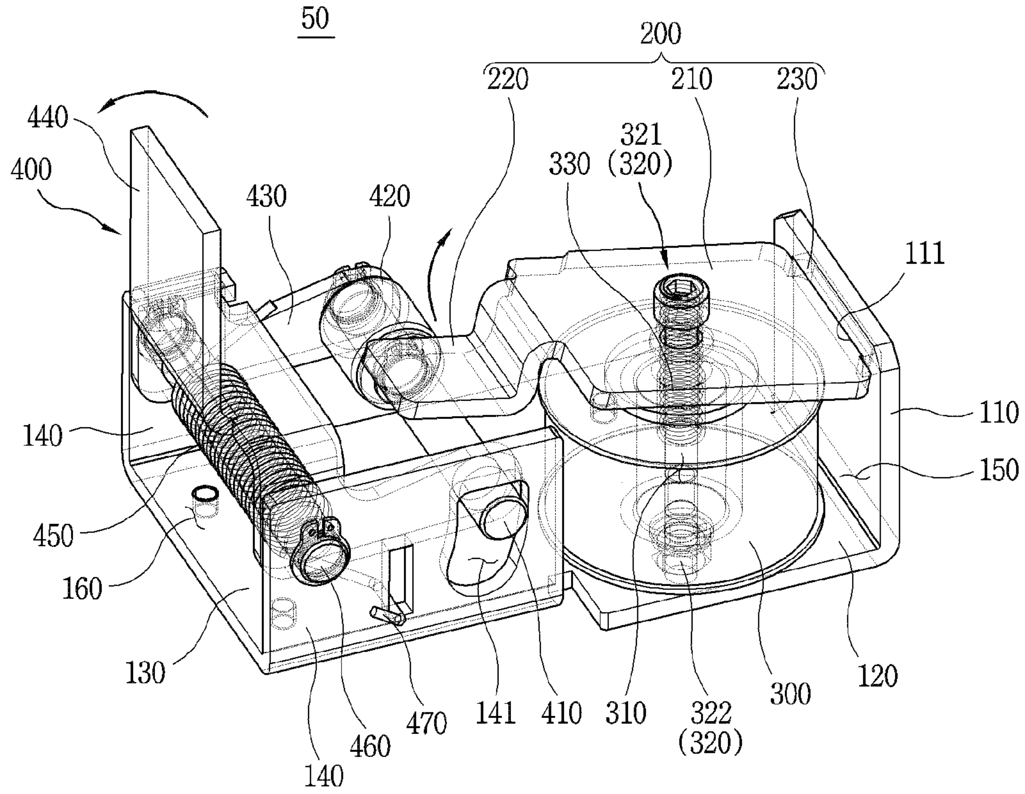

Referring to FIG. 10, the latch unit 400 when the magnetic contactor 1 is switched to the closed state is illustrated.

In this state, current is applied to the coil 30 from the closing power source. Accordingly, the coil 30 forms an electromagnetic field. The electromagnetic field formed by the coil 30 generates attractive force that attracts the movable plate 40. Accordingly, the movable plate 40 is moved toward the coil 30.

In addition, the current applied to the trip coil unit 300 is cut off. Accordingly, the trip coil unit 300 does not apply the attractive force to the movable core 200.

As described above, in the trip state, the return member 330 is pressed by the first plate 210 to be deformed, thereby storing restoring force. In addition, the elastic member 450 is deformed due to the rotation of the latch unit 400 so as to store restoring force.

Accordingly, the return member 330 returns to its original shape and transmits the stored restoring force to the first plate 210. Accordingly, the movable core 200 is rotated clockwise centering on the third plate 230.

In addition, the elastic member 450 also returns to its original shape and transmits the stored restoring force to the latch unit 400. Accordingly, the latch unit 400 is rotated counterclockwise centering on the shaft member 460.

At this time, the coupling member 320 is inserted through the through hole 211 of the first plate 210. Accordingly, the first plate 210 is rotated while the coupling member 320 is inserted through the through hole 211.

Therefore, the movable core 200 can be rotated along a preset path in the direction opposite to the trip coil unit 300 without shaking in the left and right directions or the front and rear directions.

Also, the latch pin 410 is rotated while its end is inserted into the insertion hole 141. Accordingly, the latch pin 410 is guided and moved by the inner surface of the fourth frame 140 surrounding the insertion hole 141.

The maximum distance by which the latch pin 410 is rotated may be determined according to the position of the upper end portion of the insertion hole 141. That is, the latch pin 410 may be moved clockwise until it comes into contact with the upper end portion of the insertion hole 141.

Accordingly, the operation of the latch assembly 50 is completed, and the magnetic contactor 1 can be switched to the closed state.

Therefore, in the latch assembly 50 according to the embodiment and the magnetic contactor 1 including the same, the movable core 200 can be moved along a preset path. Accordingly, the operation reliability of the latch assembly 50 and the magnetic contactor 1 including the latch assembly 50 can be improved.

Furthermore, the latch pin 410 is rotated while being slid along the insertion hole 141 formed inside the fourth frame 140. This can prevent unnecessary impact between the latch pin 410 and the fourth frame 140, which may result in improving durability (endurance limit) of the latch assembly 50 and the magnetic contactor 1 including the latch assembly 50.

Although it has been described above with reference to the preferred embodiment of the present disclosure, it will be understood that those skilled in the art are able to variously modify and change the present disclosure without departing from the scope of the invention described in the claims below.

DESCRIPTION OF REFERENCE NUMERALS

1: Magnetic contactor
10: Housing
11: Space portion
20: Support plate
30: Coil
40: Movable plate

50: Latch assembly
100: Frame
110: First frame
111: Insertion groove
120: Second frame
130: Third frame
140: Fourth frame
141: Insertion hole
150: First space portion
160: Second space portion
200: Movable core
210: First plate
211: Through hole
220: Second plate
230: Third plate
300: Trip coil unit
310: Hollow portion
320: Coupling member
321: Bolt part
322: Nut part
330: Return member
400: Latch unit
410: Latch pin
420: Latch bearing
430: Connection member
440: Trip lever
450: Elastic member
460: Shaft member
470: Latch
1000: Magnetic contactor according to the related art
1100: Housing
1200: Support plate
1300: Coil
1400: Movable plate
1500: Latch assembly
1510: First frame
1520: Second frame
1521: Support pin
1530: Movable core
1540: Trip coil
1550: Trip lever
1551: Trip pin
1552: Torsion spring
1560: Elastic portion

The invention claimed is:

1. A latch assembly comprising:
a frame;
a movable core rotatably coupled to the frame;
a trip coil unit electrically connected to an external trip power source, coupled to the frame, and applying attractive force to the movable core; and
a latch unit located adjacent to the movable core and the trip coil unit, rotatably coupled to the frame, and brought into contact with and spaced apart from the movable core,
wherein the frame comprises:
a first frame to which the movable core is rotatably coupled;
a second frame continuous with the first frame at a predetermined angle and supporting the trip coil unit from a lower side;
a third frame continuous with the second frame and extending in a direction opposite to the first frame to surround the latch unit from the lower side; and
a fourth frame continuous with the third frame at a predetermined angle and rotatably coupled to the latch unit,
wherein an insertion hole in an arcuate shape is formed in the fourth frame,
wherein the latch unit comprises:
a latch pin coupled through the insertion hole, extending in one direction, and brought into contact with and spaced apart from the movable core, and
wherein when a current is applied to the trip coil unit, the movable core rotates to rotate the latch pin along the insertion hole.

2. The latch assembly of claim 1, wherein the fourth frame is provided in plurality, and the plurality of fourth frames are disposed to face each other, and
wherein the insertion hole is formed in any one of the plurality of fourth frames.

3. The latch assembly of claim 2, wherein the frame includes a first space portion that is a space partially surrounded by the first frame and the second frame, and
wherein the trip coil unit is accommodated in the first space portion.

4. The latch assembly of claim 2, wherein the movable core is located to face the second frame with the trip coil unit interposed therebetween, and is rotatably coupled to the first frame in any one direction of a direction toward the trip coil unit and a direction away from the trip coil unit.

5. The latch assembly of claim 2, wherein the movable core comprises:
a first plate located adjacent to the trip coil unit;
a second plate continuous with the first plate, extending toward the latch unit, and brought into contact with or spaced apart from the latch unit in response to the rotation of the movable core; and
a third plate continuous with the first plate, extending toward the first frame, and rotatably coupled to the first frame,
wherein the first frame includes an insertion groove formed therethrough such that the third plate is inserted.

6. The latch assembly of claim 2, wherein the movable core includes a first plate located adjacent to the trip coil unit and rotated in a direction toward the trip coil unit and in a direction away from the trip coil unit,
wherein a hollow portion is formed through the trip coil unit and extends in a direction toward the first plate and a direction away from the first plate, and
wherein a return member is located in the hollow portion, and deformed by being pressed by the movable core so as to store restoring force.

7. The latch assembly of claim 6, wherein the return member extends in an extension direction in which the hollow portion extends, and
wherein an end portion of the return member that faces the first plate, of end portions of the return member in the extension direction, is exposed to outside of the hollow portion, so as to be located between the first plate and the trip coil unit.

8. The latch assembly of claim 6, wherein a through hole is formed through an inside of the first plate, and
wherein the trip coil unit includes a coupling member coupled through the through hole and the hollow portion.

9. The latch assembly of claim 8, wherein the coupling member extends in an extension direction in which the hollow portion extends, and
wherein an end portion of the coupling member facing the first plate, of end portions of the coupling member in the extension direction, is exposed to an outside of the first plate.

10. The latch assembly of claim 9, wherein a distance between the end portion of the coupling member and the first plate is longer than or equal to a length of a path along which the latch unit is rotated.

11. The latch assembly of claim 2, wherein the latch unit further comprises:

a shaft member connected to the latch pin and rotatably coupled to the plurality of fourth frames; and an elastic member coupled through the shaft member and storing restoring force by being deformed due to rotation of the latch unit.

12. The latch assembly of claim 11, wherein the elastic member is a coil spring.

13. A latch assembly comprising:

a frame;

a movable core rotatably coupled to the frame;

a trip coil unit electrically connected to an external trip power source, coupled to the frame, and applying attractive force to the movable core; and a latch unit located adjacent to the movable core and the trip coil unit, rotatably coupled to the frame, and brought into contact with and spaced apart from the movable core, wherein the frame comprises:

a first frame to which the movable core is rotatably coupled;

a second frame continuous with the first frame at a predetermined angle and supporting the trip coil unit from a lower side;

a third frame continuous with the second frame and extending in a direction opposite to the first frame; and a fourth frame continuous with the third frame at a predetermined angle and rotatably coupled to the latch unit, wherein the fourth frame is provided in plurality, and the plurality of fourth frames are disposed to face each other, and wherein an insertion hole is formed in any one of the plurality of fourth frames;

wherein the movable core includes a first plate located adjacent to the trip coil unit and rotated in a direction toward the trip coil unit and in a direction away from the trip coil unit, wherein a hollow portion is formed through the trip coil unit and extends in a direction toward the first plate and a direction away from the first plate, wherein a return member is located in the hollow portion, and deformed by being pressed by the movable core so as to store restoring force, wherein a through hole is formed through an inside of the first plate, and wherein the trip coil unit includes a coupling member coupled through the through hole and the hollow portion.

* * * * *